H. W. CAMPBELL.
Butter Package.

No. 163,573. Patented May 25, 1875.

WITNESSES:
P. C. Dieterich
H. C. Scott

INVENTOR:
H. W. Campbell
per
C. X. Watson & Co.
ATTORNEYS.

UNITED STATES PATENT OFFICE.

HARDY W. CAMPBELL, OF MONTGOMERY CENTRE, VERMONT.

IMPROVEMENT IN BUTTER-PACKAGES.

Specification forming part of Letters Patent No. 163,573, dated May 25, 1875; application filed April 2, 1875.

*To all whom it may concern:*

Be it known that I, HARDY W. CAMPBELL, of Montgomery Centre, in the county of Franklin and State of Vermont, have invented certain new and useful Improvements in Butter-Packages; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a series of boxes, arranged in one or more horizontal tiers, with separating frames within an exterior case, as will be hereinafter more fully set forth.

Figure 1:
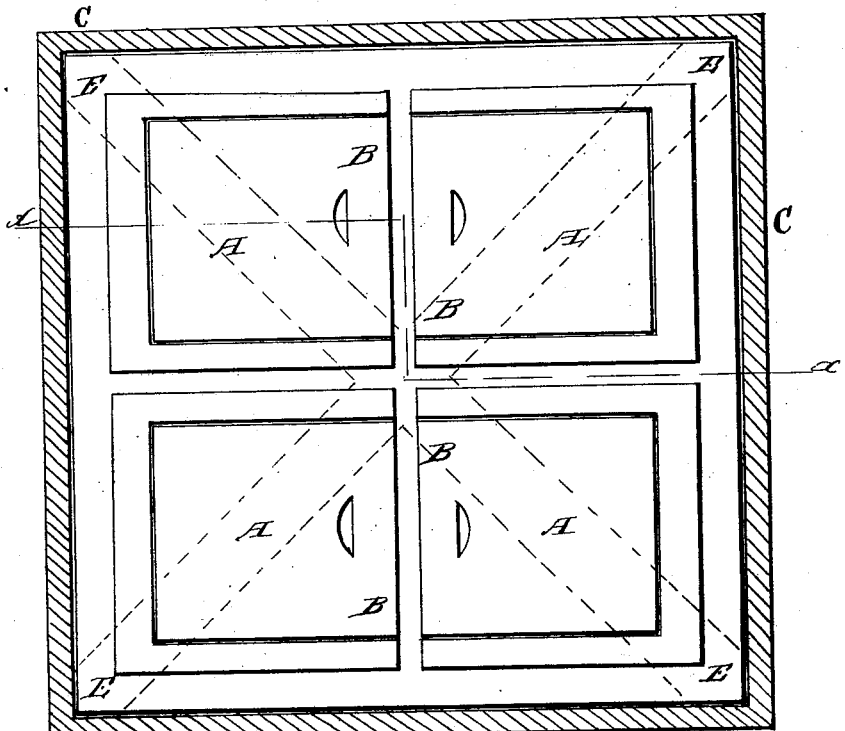
Figure 2:
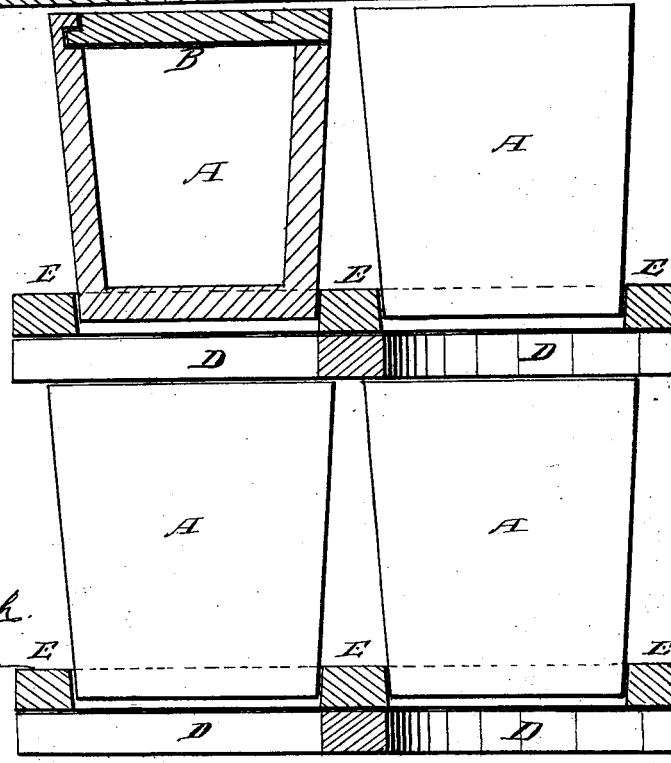

In the annexed drawing, Figure 1 is a plan view of my invention, and Fig. 2 is a vertical section through the line $x\ x$, Fig. 1.

The boxes A A, in which the butter is packed, are made of wood, in any strong and substantial manner, and provided with a lid, B, sliding in grooves made in the sides and back, so as to form close joints and present a flat surface on top, or shouldered to fit inside and over the top edges.

The boxes are made flaring, or, in other words, their sides increase gradually in size from the bottom upward to the top. By the box being larger at the top, the butter may be easily turned out without being all broken up, and will be in a nice piece, from which smaller pieces may be cut in good form and still leave the rest in good shape.

Any desired number of these boxes may be used, and they are arranged in an exterior case, C, in the following manner: On the bottom of the case C are placed two cross-bars, D D, halved into each other at the center and having their ends cut to fit the corners of the the box. On these bars is placed a frame, E, fitting snugly in the box or case C, and formed with beveled recesses to receive the lower ends of a number of boxes, A A. On top of these boxes are placed other diagonal or cross-bars D, and a frame, E, with another tier of boxes, A, until the case is full.

The case C may be made to contain any number of boxes, and each box made to contain any number of pounds.

The frames keep the boxes in their places, and allow of ice being packed around the boxes so that the butter may be shipped and be received in a cool and nice condition.

The boxes may also be used for packing lard or sugar.

The bottoms of the boxes are inserted in grooves formed in the sides.

Having thus fully described my invention, what I claim as new, and desire to secure by Letters Patent, is—

The boxes A, constructed as described, in combination with the cross-bars D, frames E, and the case C, all as and for the purposes herein specified.

In testimony that I claim the foregoing as my own I affix my signature in presence of two witnesses.

HARDY W. CAMPBELL.

Witnesses:
SAMUEL N. DIX,
JOHN GOODSPEED.